United States Patent
Im et al.

(10) Patent No.: US 9,657,631 B2
(45) Date of Patent: May 23, 2017

(54) GAS LEAKAGE PREVENTION COVER AND EXHAUST MANIFOLD HAVING THE SAME

(71) Applicant: Hyundai Motor Company, Seoul (KR)

(72) Inventors: Sung Hyun Im, Anyang-si (KR); Ji Ho Kim, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/808,763

(22) Filed: Jul. 24, 2015

(65) Prior Publication Data

US 2016/0160734 A1 Jun. 9, 2016

(30) Foreign Application Priority Data

Dec. 9, 2014 (KR) .......................... 10-2014-0176006

(51) Int. Cl.
| | | |
|---|---|---|
| *F01N 1/00* | (2006.01) | |
| *F01N 13/18* | (2010.01) | |
| *F01N 13/10* | (2010.01) | |
| *F16L 21/035* | (2006.01) | |
| *F16L 55/163* | (2006.01) | |

(52) U.S. Cl.
CPC ......... *F01N 13/1827* (2013.01); *F01N 13/10* (2013.01); *F16L 21/035* (2013.01); *F16L 55/163* (2013.01); *F01N 2470/30* (2013.01)

(58) Field of Classification Search
CPC .... F01N 13/1827; F01N 13/10; F16L 21/035; F16L 55/163; F17D 5/02

USPC ............................................................. 60/323
See application file for complete search history.

(56) References Cited

FOREIGN PATENT DOCUMENTS

| KR | 20-1998-0037723 U | 9/1998 |
| KR | 20-1999-0003251 U | 1/1999 |
| KR | 20-1999-0032316 U | 7/1999 |
| KR | 10-2006-0070629 A | 6/2006 |
| KR | 10-2007-0034265 A | 3/2007 |

OTHER PUBLICATIONS

English translation of Korean Patent Application Publication No. KR 10-2006-0070629 (Jun. 26, 2006).*
English translation of Korean Patent Application Publication No. KR 10-2007-0034265 (Mar. 28, 2007).*
English translation of Korean Patent Application Publication No. KR 1998-037723U (Sep. 15, 1998).*

* cited by examiner

*Primary Examiner* — Jason Shanske
(74) *Attorney, Agent, or Firm* — McDermott Will & Emery LLP

(57) ABSTRACT

A gas leakage prevention cover includes an inlet having a cross section area corresponding to a cross section area of a duct into which the cover is inserted, an outlet having a smaller cross section area than the cross section area of the inlet, and a step formed at a predetermined angle in a direction toward the outlet on a predetermined position of the cover. The cover has a ring shape and is configured to enable fluid to flow through an interior space of the cover from the inlet to the outlet.

4 Claims, 4 Drawing Sheets

FIG. 1
(Related Art)
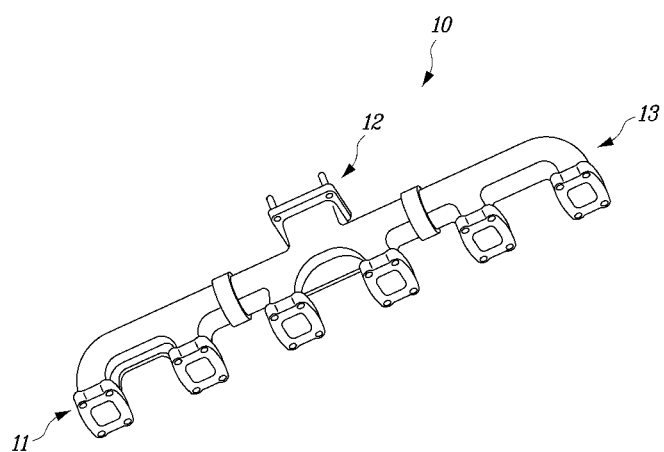
FIG, 2
(Related Art)
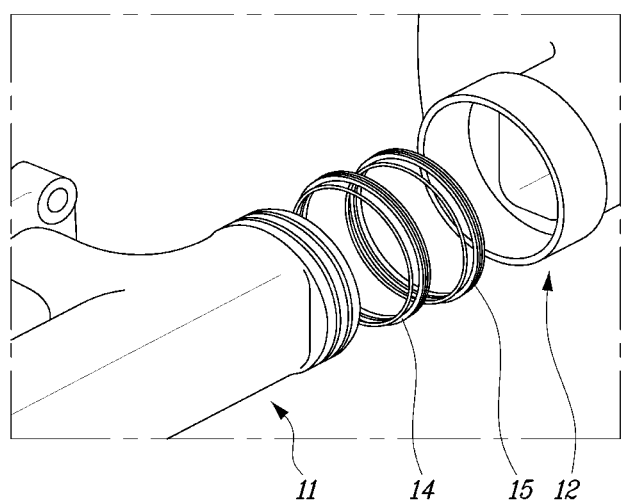

(a)        (b)        (c)

GAS LEAKAGE PREVENTION COVER AND EXHAUST MANIFOLD HAVING THE SAME

CROSS-REFERENCE(S) TO RELATED APPLICATIONS

The present application claims priority to Korean Patent Application No. 10-2014-0176006, filed Dec. 9, 2014, the entire contents of which is incorporated by reference herein.

TECHNICAL FIELD

Exemplary embodiments of the present invention relate to a gas leakage prevention cover and an exhaust manifold having the gas leakage prevention cover; and, particularly, to a technology for preventing leakage of exhaust gas and increasing the velocity of exhaust gas by attaching a gas leakage prevention cover to the inside of a connection part of an exhaust manifold.

BACKGROUND

A single-cylinder engine is configured such that an exhaust pipe is directly connected to a cylinder head so as to discharge exhaust gas to the outside, while a multi-cylinder engine including two or more cylinders is configured such that an exhaust manifold is used to collect exhaust gas discharged from each cylinder and then to discharge the collected exhaust gas to the air through an exhaust pipe.

However, since the exhaust manifold is in contact with an exhaust port of a cylinder head and thus directly receives heat of high-temperature exhaust gas discharged from a combustion chamber, the exhaust manifold may be overheated and may repeatedly contract and expand, so that the exhaust manifold may not be able to tolerate the stress and may crack.

In addition, such a repeated contraction and expansion action may cause a phenomenon in which a bolt connecting manifolds loses the axial force thereof and is thus loosened.

For these reasons, in order to reduce the stress according to thermal expansion as described above, an exhaust manifold 10 is configured in such a manner that, as shown in FIG. 1, a front manifold 11 for a cylinder head side, a rear manifold 13 for a turbocharger side, and a center manifold 12 for connecting the front and rear manifolds are separately molded, and then are assembled by connecting corresponding contact ends to each other in a sliding contact way.

In addition, as shown in FIG. 2, in order to prevent leakage of exhaust gas through the junction parts of the manifolds, a sealing ring 14 is inserted into the connection part, and an expander 15 for assisting and maintaining a tension is disposed on the inner circumferential surface of the sealing ring 14.

Accordingly, the sealing operation of a sealing part is maintained by the sum of the tensions of the sealing ring 14 and the expander 15, and by a lateral pressure caused by the pressure of exhaust gas.

However, the lateral pressure caused by the pressure of exhaust gas is not sufficient in the case of a natural aspirated engine, and cannot arrive at a pressure enough to keep sealing in a low-speed section in the case of a turbocharged engine. The reason why gas is leaked although the pressure of the sealing ring 14 to the outer circumferential surface of the ring, caused by the sealing ring 14 and the expander 15, is maintained at an appropriate level is that the lateral pressure is not appropriately generated.

Accordingly, as shown in FIG. 3, a phenomenon in which exhaust gas is leaked through a chink of the connection part occurs, thereby polluting the circumference thereof and causing a turbo lag phenomenon, which is a chronic problem of a turbocharger.

Therefore, embodiments of the present invention are intended to provide an apparatus for enabling exhaust gas to smoothly flow without leaking to the outside due to a momentary negative-pressure increase by mounting a gas leakage prevention cover on the connection part of the exhaust manifold so that the speed of exhaust gas can increase while the exhaust gas is passing through the gas leakage prevention cover.

The information disclosed in this Background section is only for enhancement of understanding of the general background and should not be taken as an acknowledgement or any form of suggestion that this information forms the prior art already known to a person skilled in the art.

SUMMARY

An embodiment of the present invention is directed to an apparatus having a gas leakage prevention cover mounted on the connection part of an exhaust manifold so that the pollution of circumference by leaked gas can be prevented from occurring, and that the turbo lag phenomenon of a turbocharger can be previously prevented from occurring through an increase in the speed of exhaust gas.

Other objects and advantages of embodiments of the present invention can be understood by the following description, and become apparent with reference to the embodiments of the present invention. Also, it is apparent to those skilled in the art to which the present invention pertains that the objects and advantages of embodiments of the present invention can be realized by the means as claimed and combinations thereof.

In accordance with an embodiment of the present invention, a gas leakage prevention cover may include an inlet having a cross section area corresponding to a cross section area of a duct into which the cover is inserted, an outlet having a smaller cross section area than the cross section area of the inlet, and a step formed at a predetermined angle in a direction toward the outlet on a predetermined position of the cover. The cover may have a ring shape and may be configured to enable fluid to flow through an interior space of the cover from the inlet to the outlet. In certain embodiments, a gas leakage prevention cover may include: an inlet part configured to have a predetermined length and having a cross section area corresponding to a cross section area of a duct into which the cover is inserted. A junction part may be inclined at a predetermined angle so as to decrease the cross section area of the cover from an end of the inlet part. An outlet part may extend by a predetermined length from an end of the junction part.

In certain embodiments, the outlet part may have a plurality of holes which communicate between an inside area and an outside area of the outlet part and may be spaced apart by a predetermined interval.

In certain embodiments, the junction part may have a curved shape.

In accordance with another embodiment of the present invention, an exhaust manifold includes an inlet manifold configured to allow exhaust gas to be introduced therethrough and having a connection part. A center manifold may be connected to the inlet manifold by the connection part. A ring-shaped gas leakage prevention cover may be mounted on an inside surface of the connection part The cover may have an inlet having a cross section area corresponding to a cross section area of the inlet manifold and an outlet having a cross section area smaller than the cross section area of the inlet of the cover. The cover may be configured to allow exhaust gas to flow through an interior space of the cover from the inlet to the outlet. In certain embodiments, the cover may include an inlet part extending by a predetermined length from the inlet towards the outlet and having a cross section area corresponding to the cross section area of the inlet. An outlet part may extend by a predetermined length from the outlet towards the inlet. A junction part having an inlet side connected to the inlet part and an outlet side connected to the outlet part may be inclined at a predetermined angle from the inlet side to the outlet side such that the cross section of the outlet side of the junction part is smaller than the cross section of the inlet side of the junction part. In certain embodiments, the outlet part may be configured to have a plurality of holes which communicate between an inside area and an outside area of the outlet part and are spaced apart by a predetermined interval.

In certain embodiments, a groove having a predetermined depth may be disposed along an end edge of the inside surface of the inlet manifold and may be configured to allow the cover to be fitted into the inlet manifold.

BRIEF DESCRIPTION OF THE DRAWINGS

FIG. 1 is a view illustrating the configuration of a conventional exhaust manifold;

FIG. 2 is an exploded view illustrating the conventional exhaust manifold;

DETAILED DESCRIPTION

Figure 3:
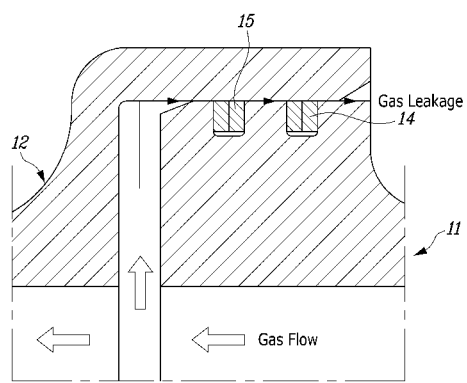
FIG. 3 is a view illustrating an exhaust gas flow for showing a state in which exhaust gas is leaked from a connection part of a conventional exhaust manifold.

A gas leakage prevention cover and an exhaust manifold having the gas leakage prevention cover in accordance with exemplary embodiments of the present invention will be described below in more detail with reference to the accompanying drawings. The present invention may, however, be embodied in different forms and should not be construed as limited to the embodiments set forth herein. Throughout the disclosure, like reference numerals refer to like parts throughout the various figures and embodiments of the present invention.

Figure 4:
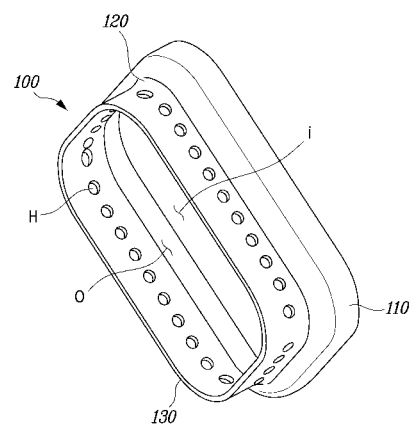
FIG. 4 is a general perspective view illustrating a gas leakage prevention cover in accordance with an embodiment of the present invention.

FIG. 4 is a general perspective view illustrating a gas leakage prevention cover in accordance with an embodiment of the present invention.

As shown in FIG. 4, an embodiment of the present invention includes a ring-shaped cover 100 for enabling fluid to flow through an inlet and an outlet formed with respect to the interior space thereof, wherein the cross section area "i" of the inlet of the cover 100 is greater than the cross section area "o" of the outlet, wherein the cross section area "i" of the inlet corresponds to the cross section area of a duct into which the cover 100 is inserted, and the cover 100 has a step formed at a predetermined angle in a direction toward the outlet on a predetermined position thereof.

In certain embodiments, the gas leakage prevention cover 100 in accordance with an embodiment of the present invention can be applied to any duct which may cause leakage at a connection part thereof, wherein the cover is characterized by a ring shape in which the cross section area of the outlet is less than the cross section area of the inlet through which fluid is introduced.

In accordance with an embodiment of the present invention, the cover can prevent fluid from being leaked through a chink formed on a connection part of a duct. In addition, when the cover is mounted on the inside of an exhaust manifold, the cross section area through which fluid can flow gradually decreases to increase the speed of the fluid as the fluid flows, so that the turbo lag phenomenon due to a low speed, which has been appointed out as a chronic problem of a turbocharger, can be prevented.

In certain embodiments, the gas leakage prevention cover 100 to be described later in detail is configured to have a two-step cross-sectional shape. Thus, the speed of fluid increases while the fluid is passing through the inside of the cover, so that a negative pressure is formed in a moment.

In this case, when the gas leakage prevention cover 100 in accordance with an embodiment of the present invention is mounted on the inside of a connection part 11a of an exhaust manifold, the pressure of exhaust gas at a leakage part, which has been considered as a problem in the prior art, is changed from a positive pressure to a negative pressure, so that exhaust gas can smoothly flow to the turbine of a turbocharger, thereby previously preventing the gas leakage phenomenon from occurring.

Figure 5:
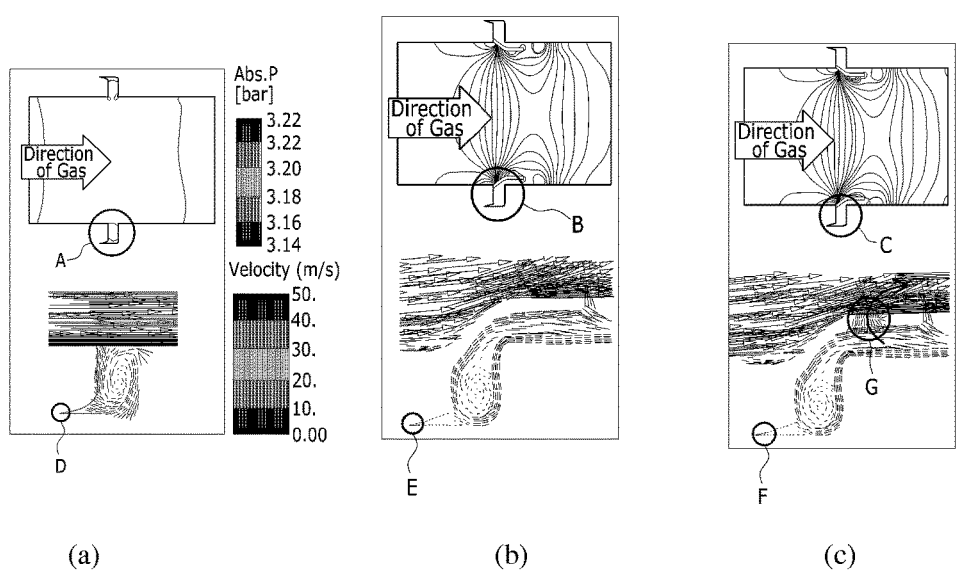
FIG. 5 is a view showing a change of pressure in an exhaust manifold and a change in the velocity of exhaust gas in a gas leakage part when the gas leakage prevention cover in accordance with an embodiment of the present invention is mounted on a connection part of the exhaust manifold.

FIG. 5 is a view showing a change of pressure in an exhaust manifold and a change in the velocity of exhaust gas in a gas leakage part when the gas leakage prevention cover 100 in accordance with an embodiment of the present invention is mounted on a connection part 11a of an exhaust manifold.

In FIG. 5, "(a)" is a view showing a change in pressure and the speed of exhaust gas in a gas leakage part when a gas leakage prevention cover according to an embodiment of the present invention is not mounted on a connection part of a conventional exhaust manifold; "(b)" is a view showing a change in pressure and the speed of exhaust gas in a gas leakage part when a gas leakage prevention cover according to an embodiment of the present invention is mounted; and "(c)" is a view showing changes in pressure and speed when a gas leakage prevention cover having a plurality of holes formed therethrough, to be described later in another embodiment, is mounted.

Here, comparing "(a)" with "(b)", the pressure of a conventional gas leakage part (A) measured 202+0.04 kpa, while the pressure of a gas leakage part (B) in accordance with an embodiment of the present invention measured 202−2.33 kpa, wherein it can be understood that a pressure by about 1.2% with respect to the reference value 202 kpa was reduced.

That is to say, the pressure of the gas leakage part is changed from a positive pressure to a negative pressure by the "Venturi effect" due to the pressure reduction, so that exhaust gas can smoothly move to the turbine side of the turbocharger, thereby preventing leakage.

In addition, comparing a speed "D" in the conventional gas leakage part with a speed "E" in the gas leakage part to which an embodiment of the present invention is applied, it could be identified that the speed "E" in the gas leakage part to which an embodiment of the present invention was applied was lower than the speed "D" in the conventional gas leakage part. Accordingly, the speed of exhaust gas flowing through the inside of an exhaust manifold increased, so that the turbo lag phenomenon also could be previously prevented from occurring.

Meanwhile, referring again to FIG. 4, the detailed structure of the gas leakage prevention cover in accordance with an embodiment of the present invention is as follows.

As shown in FIG. 4, the gas leakage prevention cover includes, in certain embodiments: an inlet part 110 configured to have a predetermined length and to correspond to the cross section area of a duct into which the cover is inserted; a junction part 120 configured to be inclined at a predetermined angle so as to decrease the cross section area of the cover from an end of the inlet part 110; and an outlet part 130 configured to be extended by a predetermined length from an end of the junction part 120.

That is to say, as described above, the cover according to embodiments of the present invention is formed in a two-step structure, wherein the cross section area "i" of an inlet through which fluid is introduced is configured to be greater than the cross section area "o" of an outlet through which the fluid is outputted after passing through the inside of the cover. In addition, a portion connecting the inlet part 110 and the outlet part 130 is configured as the junction part 120 which is inclined at a predetermined angle so as to decrease the cross section area of the cover toward the outlet side.

It goes without saying that the shape of the cross section area of the cover may be variously changed depending on the shape of the cross section of a duct on which the cover is mounted, and that, in certain embodiments, the junction part 120 provided between the inlet part 110 and the outlet part 130 may be configured in a curved shape so that the speed of fluid can increase while the fluid is passing through the cover, which enables the fluid to flow with friction minimized.

In accordance with certain embodiments of the present invention, the outlet part 130 is configured to have a plurality of holes "H" which communicate between the inside and outside of the outlet part 130 and are spaced apart by a predetermined interval from each other.

That is to say, as shown in FIG. 4, the plurality of holes "H" may be formed on the outlet part 130 along the circumference of the outlet part 130.

Figure 6:
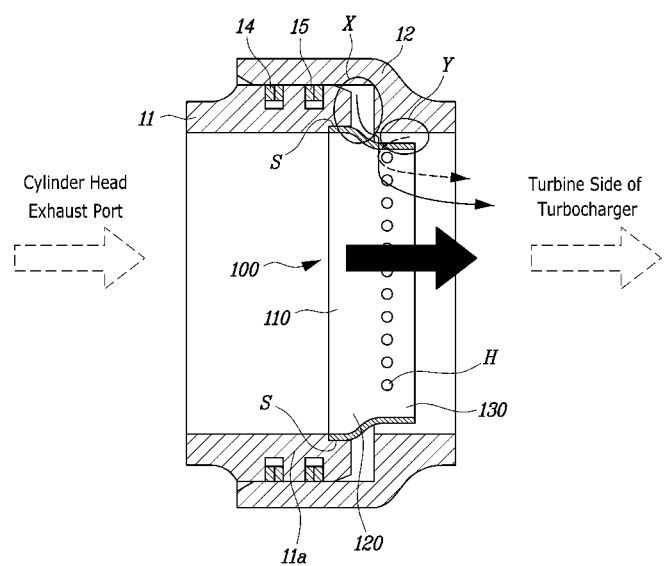
FIG. 6 is a connection view illustrating a gas leakage prevention cover which is provided therethrough with a plurality of holes and is connected to the inside of an exhaust manifold in accordance with an embodiment of the present invention.

Accordingly, when the cover according to an embodiment of the present invention is mounted on the inside of a connection part 11a of an exhaust manifold, as shown in FIG. 6, by the vortex phenomenon of exhaust gas generated in space "Y" between the inside surfaces of a center manifold 12 and the cover, exhaust gas introduced to an expander 15 and exhaust gas stagnating in space "X", which is formed by the inside surfaces of the cover, a front manifold 11 and the center manifold 12, can smoothly move to the outlet side along the plurality of holes "H" formed at the outlet part.

In this case, referring again to "(c)" of FIG. 5, the pressure of the conventional gas leakage part (A) measured 202+0.04 kpa, while the pressure of a gas leakage part (C) in accordance with an embodiment of the present invention measured 202−2.61 kpa, wherein it can be understood that a pressure by about 1.3% with respect to the reference value 202 kpa was reduced.

That is to say, it could be identified: that the pressure of the gas leakage part was changed from a positive pressure to a negative pressure by what is called the "Venturi effect" due to the reduction of pressure in the gas leakage part, so that exhaust gas could smoothly move to the turbine side of the turbocharger, thereby preventing leakage; and that a better effect was obtained than in case "(b)" in which a plurality of holes were not formed.

In addition, comparing the speed "D" in the conventional gas leakage part with the speed "F" in the gas leakage part to which an embodiment of the present invention is applied, it could be identified that the speed "F" was slower than the conventional speed "D". Accordingly, the speed of exhaust gas flowing through the inside of the exhaust manifold increased, so that the turbo lag phenomenon was previously prevented from occurring. In addition, a phenomenon in which exhaust gas is more introduced into the inside of the exhaust manifold along the plurality of holes could be identified as indicated by reference sign "G".

Meanwhile, referring again to FIG. 6, a view illustrating a state in which the gas leakage prevention cover 100 is connected to the inside of an exhaust manifold in accordance with an embodiment of the present invention is shown. As shown in FIG. 6, an inlet manifold 11 configured to allow exhaust gas to be introduced therethrough, a center manifold 12 configured to be connected to the inlet manifold 11, and the cover 100 configured to be mounted on the inside surface of a connection part 11a between the inlet manifold 11 and the center manifold 12 are included.

In certain embodiments, the inlet manifold 11 may be a front manifold 11 and a rear manifold 13 disposed at a turbocharger side.

In this case, the cover 100 is configured in a ring shape which allows exhaust gas to flow in the interior space thereof from the inlet to the outlet, wherein the cross section area of the inlet of the cover is configured to be greater than the cross section area of the outlet thereof. In addition, the cross section area of the inlet is configured to correspond to the cross section area of the inlet manifold 11, and the cover 100 is configured to have a step formed at a predetermined angle in a direction toward the center manifold 12 on a predetermined position thereof.

In certain embodiments, the cover 100 may include: an inlet part 110 extending a predetermined length from the inlet of the cover towards the outlet. to the inlet part may have a cross section area corresponding to the cross section area of the inlet manifold 11 into which the cover 100 is inserted. An outlet part extends by a predetermined length from the outlet towards the inlet. A junction part 120 having an inlet side connected to the inlet part and an outlet side connected to the outlet part is inclined at a predetermined angle from the inlet side to the outlet side such that the cross section of the outlet side of the junction part 120 is smaller than the cross section of the inlet side of the junction part 120.

In certain embodiments, the outlet part 130 may be configured to have a plurality of holes "H" which communicate between an inside area and an outside area of the outlet part 130 and are spaced apart by a predetermined interval.

In certain embodiments, a groove "S" having a predetermined depth may be formed along the end edge of the inside surface of the inlet manifold 11 so that the gas leakage prevention cover can be fitted into the inlet manifold 11.

In certain embodiments, the groove "S" having the predetermined depth is processed on the end of the inlet manifold 11, and the gas leakage prevention cover is fitted and fastened along the groove "S".

According to the gas leakage prevention cover and the exhaust manifold having the gas leakage prevention cover in accordance with the exemplary embodiments of the present invention, exhaust gas leakage at the connection part of the exhaust manifold and the turbo lag phenomenon can be previously prevented from occurring, and simultaneously, costs for replacement of the exhaust manifold can be saved.

While embodiments of the present invention have been described herein, it will be apparent to those skilled in the art that various changes and modifications may be made without departing from the spirit and scope of the invention as defined in the following claims.

What is claimed is:

1. A gas leakage prevention cover comprising:
    an inlet having a predetermined length and a cross section area corresponding to a cross section area of a duct into which the cover is inserted;
    an outlet having a smaller cross section area than the cross section area of the inlet;
    a step formed at a predetermined angle in a direction toward the outlet on a predetermined position of the cover; and
    a junction part inclined at a predetermined angle so as to decrease the cross section area of the cover from an end of the inlet,
    wherein the outlet is extended by a predetermined length from an end of the junction part,
    wherein the cover has a ring shape and is configured to enable fluid to flow through an interior space of the cover from the inlet to the outlet, and
    wherein the outlet has a plurality of holes which communicate between an inside area and an outside area of the outlet and are spaced apart by a predetermined interval.

2. The cover of claim 1, wherein the junction part has a curved shape.

3. An exhaust manifold comprising:
    an inlet manifold configured to allow exhaust gas to be introduced therethrough, the inlet manifold having a connection part;
    a center manifold connected to the inlet manifold by the connection part; and
    a ring-shaped gas leakage prevention cover mounted on an inside surface of the connection part, the cover comprising an inlet having a cross section area corresponding to a cross section area of the inlet manifold and an outlet having a cross section area smaller than the cross section area of the inlet of the cover,
    wherein the cover is configured to allow exhaust gas to flow through an interior space of the cover from the inlet to the outlet,
    wherein the cover comprises:
        an inlet part extending by a predetermined length from the inlet towards the outlet and having a cross section area corresponding to the cross section area of the inlet;
        an outlet part extending by a predetermined length from the outlet towards the inlet; and
        a junction part having an inlet side connected to the inlet and an outlet side connected to the outlet, the junction part inclined at a predetermined angle from the inlet side to the outlet side such that the cross section of the outlet side of the junction part is smaller than the cross section of the inlet side of the junction part,
    wherein the outlet part is configured to have a plurality of holes which communicate between an inside area and an outside area of the outlet part and are spaced apart by a predetermined interval.

4. The exhaust manifold of claim 3, wherein a groove having a predetermined depth is disposed along an end edge of the inside surface of the inlet manifold and is configured to allow the cover to be fitted into the inlet manifold.

* * * * *